United States Patent [19]
Fiora

[11] Patent Number: 6,014,909
[45] Date of Patent: Jan. 18, 2000

[54] ROBOT WRIST

[75] Inventor: Aldo Fiora, Piossasco, Italy

[73] Assignee: Comau S.p.A., Turin, Italy

[21] Appl. No.: 09/064,051

[22] Filed: Apr. 22, 1998

[30] Foreign Application Priority Data

Apr. 23, 1997 [IT] Italy .................................. TO97A0349

[51] Int. Cl.[7] .................................. B25J 17/02; B25J 9/12
[52] U.S. Cl. .................................. 74/490.02; 74/490.03; 74/490.06; 901/23; 901/26; 901/29
[58] Field of Search .......................... 74/490.02, 490.03, 74/490.06; 901/23, 26, 29

[56] References Cited

U.S. PATENT DOCUMENTS

| | | | |
|---|---|---|---|
| 4,151,390 | 4/1979 | Bisiach | 219/124.1 |
| 4,703,668 | 11/1987 | Peter | 901/29 X |
| 4,708,580 | 11/1987 | Akeel | 414/735 |
| 4,787,270 | 11/1988 | Suica | 74/665 M |
| 5,437,207 | 8/1995 | Zimmer | 74/490.02 |
| 5,460,536 | 10/1995 | Cullen | 439/289 |
| 5,816,108 | 10/1998 | Obata et al. | 74/490.05 |

*Primary Examiner*—Allan D. Herrmann
*Attorney, Agent, or Firm*—Sughrue, Mion, Zinn Macpeak & Seas, PLLC

[57] ABSTRACT

There is described a wrist for an industrial robot, comprising three wrist elements rotatably supported relative to each other around respective rotation axes which are coplanar and mutually inclined, which leave a space inside thereof free for passage of supply cables which are to be connected to the tool secured to the robot wrist. The latter has a front flange for coupling the tool and a plurality of radial outlets for the above mentioned supply cables, so as to allow for the use of a tool coupling flange having a simplified structure.

4 Claims, 4 Drawing Sheets

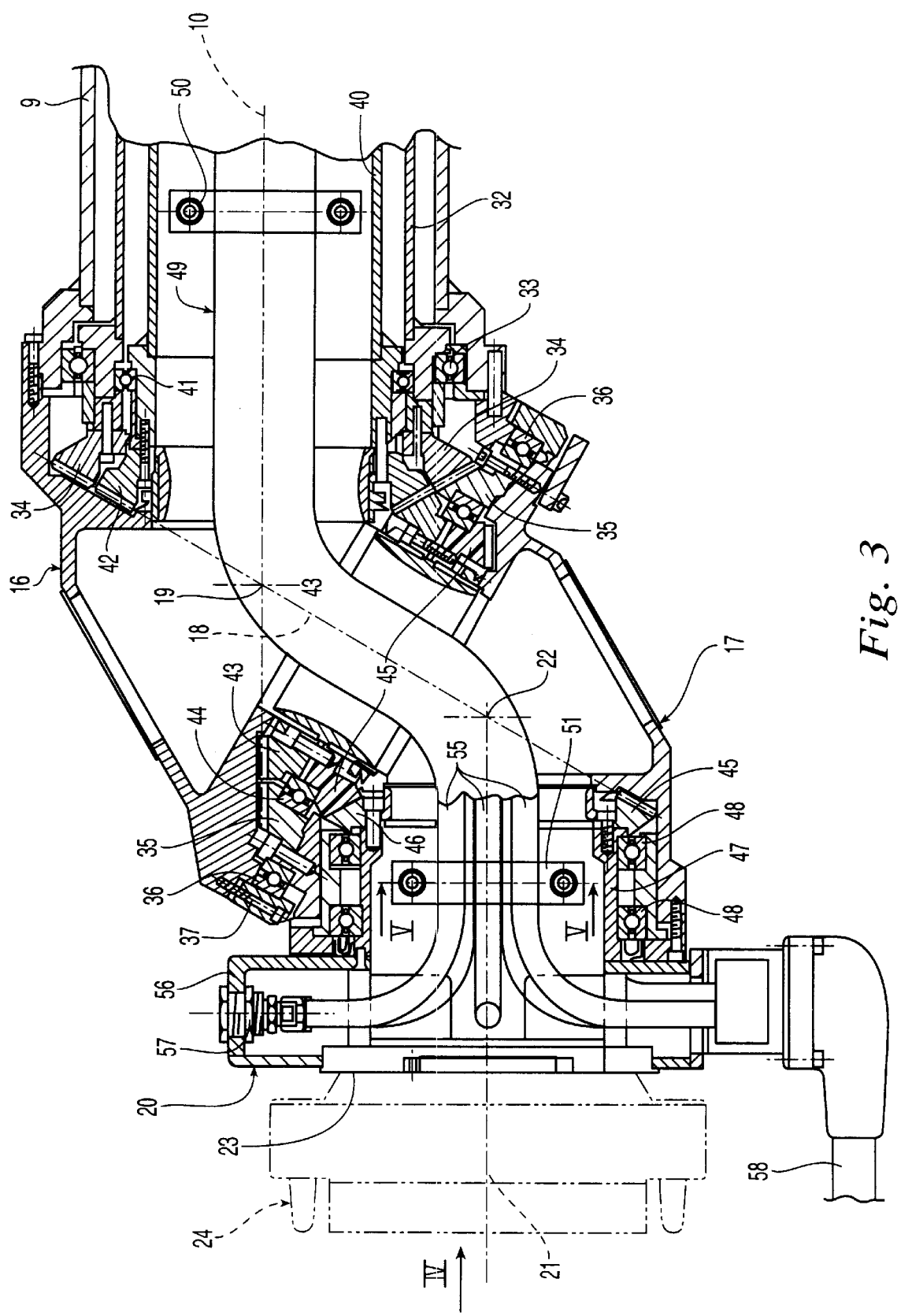

ROBOT WRIST

BACKGROUND OF THE INVENTION

The present invention relates to a wrist of an industrial robot of the known type comprising:
  a first wrist element, carried by a robot arm which is rotatable around a first axis with respect to a structure supporting said arm,
  a second wrist element, rotatably supported by said first wrist element around a second axis which crosses the first axis at an angle relative thereto,
  a third wrist element rotatably supported by said second wrist element around a third axis which is inclined with respect to the second axis and coplanar with said first and second axes, said third wrist element including a flange for coupling of a tool,
  wherein said robot arm is hollow and the second and third wrist elements are connected in rotation to two tubular shafts arranged concentrically within the robot arm, the ends of said arm and said tubular shafts opposite to the robot wrist being connected to respective motors driving rotation of said three wrist elements,
  said wrist elements and said tubular shafts leaving a space inside thereof free for passage of electric and fluid supply lines for the tool which is to be coupled to the robot wrist.

A robot wrist of the above indicated type is disclosed for example in U.S. Pat. No. 4,151,390.

The above mentioned known solution is particularly advantageous since it provides the arrangement of the cables for electric and fluid supply to the tool completely inside the arm and the robot wrist. However, a drawback of this solution lies in that it requires providing a tool coupling flange on said third wrist element of the robot which cannot be of a standardized type, since it must allow for passage of the tool supply lines. In case for example the tool is an electric spot welding head, these lines comprise the cables for power electric supply to the welding electrodes, the electric cables for transmitting signals emitted by sensor devices associated with the welding head, the tubes for supplying pressurized air to the welding head actuator (or electric cables in case of a head actuated by an electric motor) and the cables for supplying cooling water to the electrodes.

SUMMARY OF THE INVENTION

In order to simplify the above described known solution, the present invention provides a robot of the type indicated at the beginning, characterized in that the said third wrist element has a standardized front flange for coupling the tool and is provided on its outer surface with a plurality of radial outlets for the electric and fluid supply lines.

In particular, at said peripheral wall, the third wrist element is provided with a plurality of connecting elements for fluid coupling and electric connectors for connecting the various electric apparatus on the tool.

Due to the above mentioned feature, it is therefore possible to provide the robot wrist with a tool coupling flange having a simplified and standardized structure, according to EN 29409-1 rules, without the complications which are instead necessary in the case of the above described known solution.

BRIEF DESCRIPTION OF THE DRAWINGS

Further features and advantages of the invention will become apparent from the description which follows with reference to the annexed drawings, given purely by way of non limiting example, in which:

FIG. 3 is a view at an enlarged scale and in cross-section of the robot wrist.

DETAILED DESCRIPTION OF THE INVENTION

Figure 1:
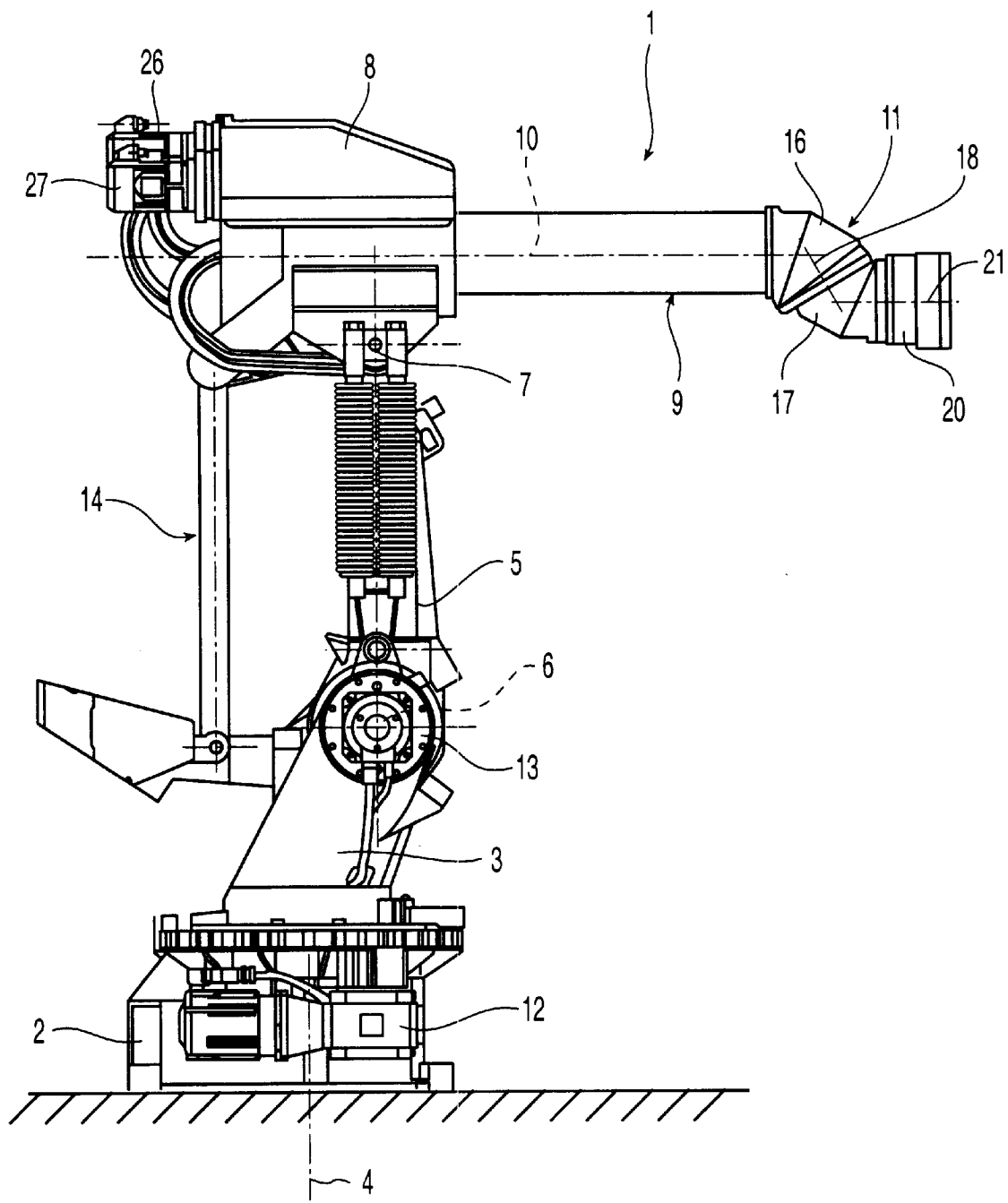
FIG. 1 is an elevational side view of an embodiment of the robot according to the invention.

In FIG. 1, numeral 1 generally designates an industrial robot using the wrist according to the invention. This robot is shown herein purely by way of example, since it is clearly apparent that the wrist according to the invention can be used also on a robot of any different type.

In case of the illustrated example, the robot 1 has a base structure 2 which rotatably supports an upright 3 around a vertical axis 4. The upright 3 on its turn rotatably supports a vertical arm 5 around a horizontal axis 6. The upper end of the vertical arm 5 on its turn rotatably supports a structure 8 carrying an arm 9 around a horizontal axis 7. The arm 9 is rotatably supported by structure 8 around an axis 10 coincident with the axis of the arm. The distal end of arm 10 carries a wrist 11 to be coupled to a tool (not shown in FIG. 1), such as an electric spot welding head.

At the base 2 of the robot there is associated a motor and reducing unit 12 for driving rotation of the upright 3 around axis 4. The upright 3 carries a motor unit 13 for driving rotation of the vertical arm 5 around the axis 6, as well as a further motor unit (not shown in FIG. 1) which drives rotation of structure 8 around the axis 7 by means of a lever transmission 14. The rotation of arm 9 around axis 10 and that of the elements of wrist 11 is driven by means of further electric motors carried by structure 8, as it will be described more in detail in the following.

Figure 2:
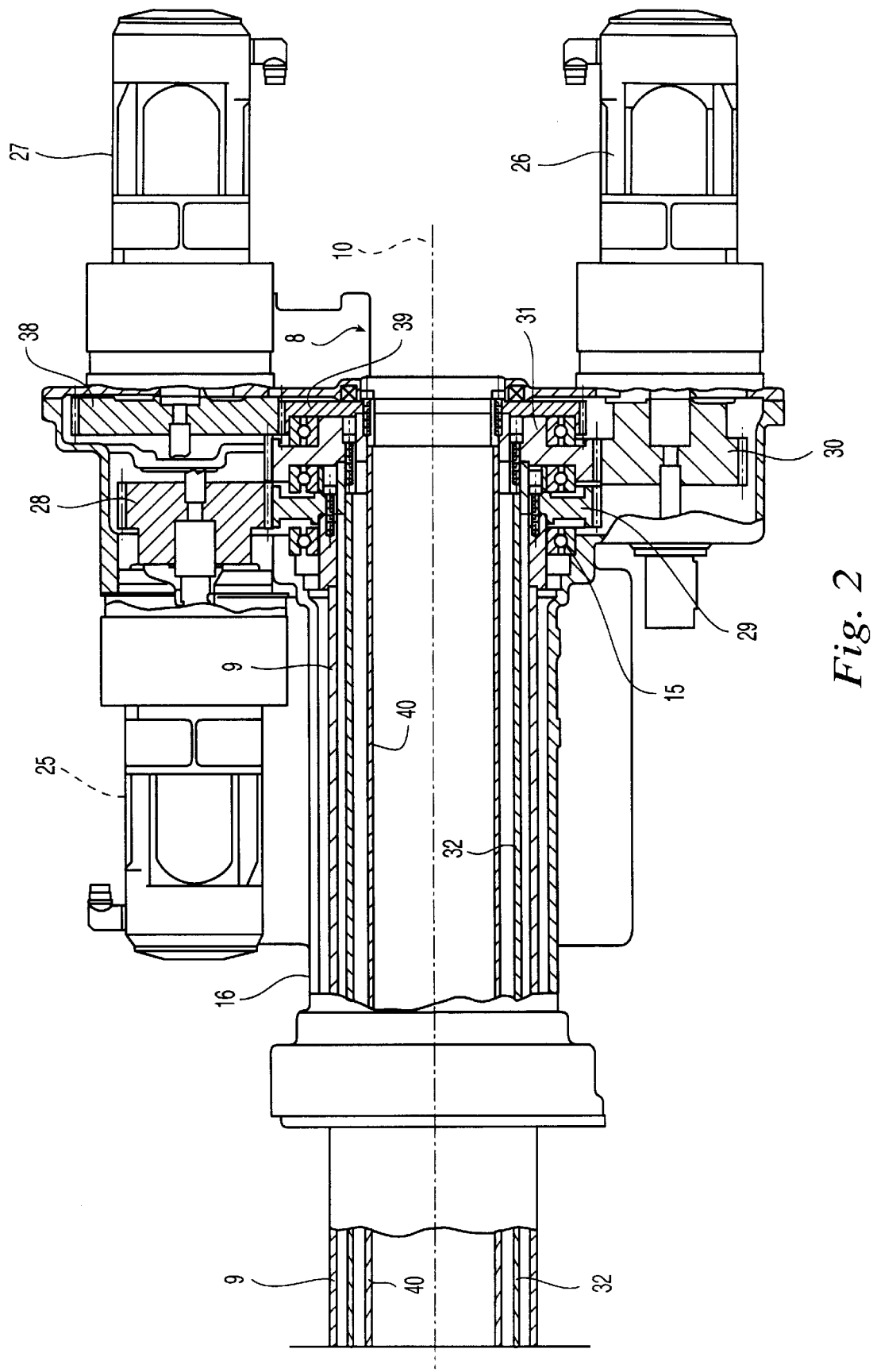
FIG. 2 is a view at an enlarged scale, partially in cross-section, of the end of the robot arm opposite to the wrist.

With reference to FIG. 2, the arm 9 of the robot, of which FIG. 2 shows only the end portion opposite to wrist 11, is supported by means of bearings 15 (only one of which is visible in FIG. 2) by a tubular portion 16 of the supporting structure 8.

With reference to FIG. 3, the distal end of the tubular arm 9 of the robot rigidly supports a first wrist element 16, which therefore is able to rotate with the arm 9 around axis 10. The first wrist element 16 on its turn supports a second wrist element 17 rotatably around an axis 18 which crosses axis 10 at 19 and is inclined relative thereto. The second wrist element 17 on its turn rotatably supports a third wrist element 20 around an axis 21 which crosses axis 18 at 22 and is inclined relative thereto, the axis 21 further lying in the same plane where axes 10, 18 lie. In case of the illustrated embodiment, the axis 21 is parallel to axis 10. The third wrist element 20 is provided with a front flange 23, shown in front view in FIG. 4 and provided with means for securing a tool, such as an electric spot welding head, a portion 24 of which is shown in FIG. 3.

The three wrist elements 16, 17, 20 are driven in rotation around respective axes 10, 18, 21 by three motor and reducing units 25, 26, 27 (see FIG. 2) which are carried by structure 8 (see also FIG. 1).

The motor and reducing units 25, 26, 27 are connected to the wrist elements 16, 17, 20 driven thereby by means of respective gear transmissions. In particular, on the output shaft of the electric motor and reducing unit 25 there is secured a toothed wheel 28 (FIG. 2) which meshes with a further toothed wheel 29 rigidly connected to the proximal end of the tubular arm 9. At its distal end (FIG. 3) arm 9, as already indicated above, is rigidly connected to the first wrist element 16, which therefore rotates therewith around axis 10 when the motor and reducing unit 25 is activated. The motor and reducing unit 26 drives a toothed wheel 30 meshing on its turn with a toothed wheel 31 which is rigidly connected at one end to a tubular shaft 32 arranged concentrically inside the tubular arm 9. At its opposite end (FIG. 3) the shaft 32 is rotatably supported around axis 10 by the tubular arm 9 by means of a bearing 33 and carries a bevel gear 34 arranged with its axis coincident with axis 10. The bevel gear 34 meshes with a further bevel gear 35 arranged with its axis coincident with axis 18 and rigidly connected to the second wrist element 17. The latter is rotatably supported around axis 18, by means of a bearing 36, by a tubular appendage 37 concentrical with axis 18 of the first wrist element 16. Therefore, when the electric motor 26 is actuated, it drives rotation of the tubular shaft 32 arranged concentrically inside the tubular arm 9 by means of the pair of bevel gears 30, 31. The tubular shaft 32 on its turn transmits its rotation to the second wrist element 17 by means of the pair of bevel gears 34, 35, so that the second wrist element 17 rotates with respect to the first wrist element 16 around axis 18.

The motor and reducing unit 27 drives a toothed wheel 38 meshing with a further toothed wheel 39 which is rigidly connected to the proximal end of a further tubular shaft 40 arranged concentrically inside the tubular shaft 32. At its distal end (FIG. 3) the tubular shaft 40 is rotatably supported around axis 10 by the tubular shaft 32 by means of a bearing 41 and carries a bevel gear 42 having its axis coincident with axis 10. The bevel gear 42 meshes with a bevel gear 43 having its axis coincident with axis 18 which is rotatably supported around axis 18 with respect to the bevel gear 35, by means of a bearing 44. The bevel gear 43 is rigidly connected to a further bevel gear 45 coaxial therewith but facing in the opposite direction, which meshes with a bevel gear 46 having its axis coincident with axis 21. The bevel gear 46 is rigidly connected to a tubular body 47 forming part of the third wrist element 20, which is rotatably supported around axis 21, by means of bearings 48, by a tubular appendage of the second wrist element 17 which is coaxial with axis 21. Therefore, when the electric motor 27 is actuated, it drives rotation around axis 10 of the tubular shaft 40, by means of the pair of gears 38, 39. The tubular shaft 40 on its turn transmits this rotation to the third wrist element 20, by means of the pair of bevel gears 42, 43 and the pair of bevel gears 45, 46. The third wrist element 20 is thus driven in rotation around axis 21 with respect to the second wrist element 17. By simultaneously and/or alternatively activating the three motor and reducing units 25, 26, 27 it is thus possible to bring the tool coupling flange 23 to any point in space within a determined action area of the robot wrist.

As already indicated above, the above described general configuration of the arm and the robot wrist is known per se. However, the arrangement of the three motor and reducing units 25, 26, 27 rigidly connected to the supporting structure 8 and connected to the three wrist elements by means of a gear transmission of the above described type is instead new and unique.

The most relevant feature of the invention, however, is that which will be described hereinunder. As also has been clarified at the beginning of the present description, an advantage of the general arrangement described above lies in that a space is thus defined inside arm 9 and tubular shafts 32, 40, as well inside the three wrist elements 16, 17, 20, which is free for the passage of the electric and fluid supply lines which are to be connected to the tool secured to the robot wrist.

Figure 5:
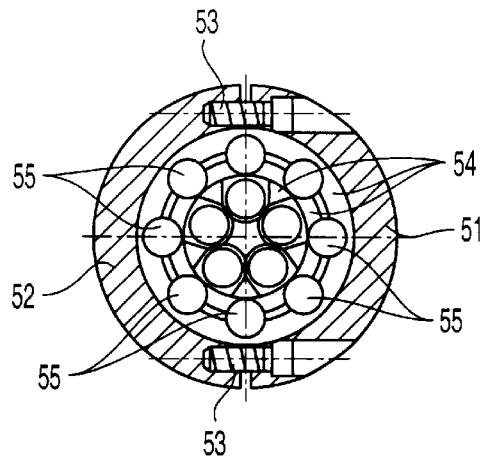
FIG. 5 is a view in cross-section taken along line V—V of FIG. 3.

Therefore, these lines can be arranged completely inside the arm 9, with a number of advantages, such as a more reduced outer bulk of the arm, an absence of a risk of interference between cables and tubes and the fixed parts around which the robot is displaced and also lower problems due to deformations and torsions to which cables and tubes are subjected while the operations for which the robot is used are being carried out. For example in the case in which the tool 24 is an electric spot welding head, these lines comprise cables for the power electric supply to the welding electrodes, electric cables for transmitting signals emitted by sensors associated with the tool, tubes for supplying pressurized air to the device actuating the welding head (or electric cables in case of a head actuated by an electric motor) and tubes for supplying water for the electrode cooling circuit. In FIG. 3, reference numeral 49 designates the bundle of the above mentioned cables which is passed through the inside of arm 9 and the robot wrist. The bundle 49 is clamped by means of two clamps 50, 51 respectively located inside the tubular shaft 40 and the tubular element 47. FIG. 5 shows a cross-section of clamp 51, which is identical to clamp 50, comprising two jaws 52 clamped with each other by means of screws 53 and locking concentrical annular elements 54 around the various supply cables 55.

Figure 4:
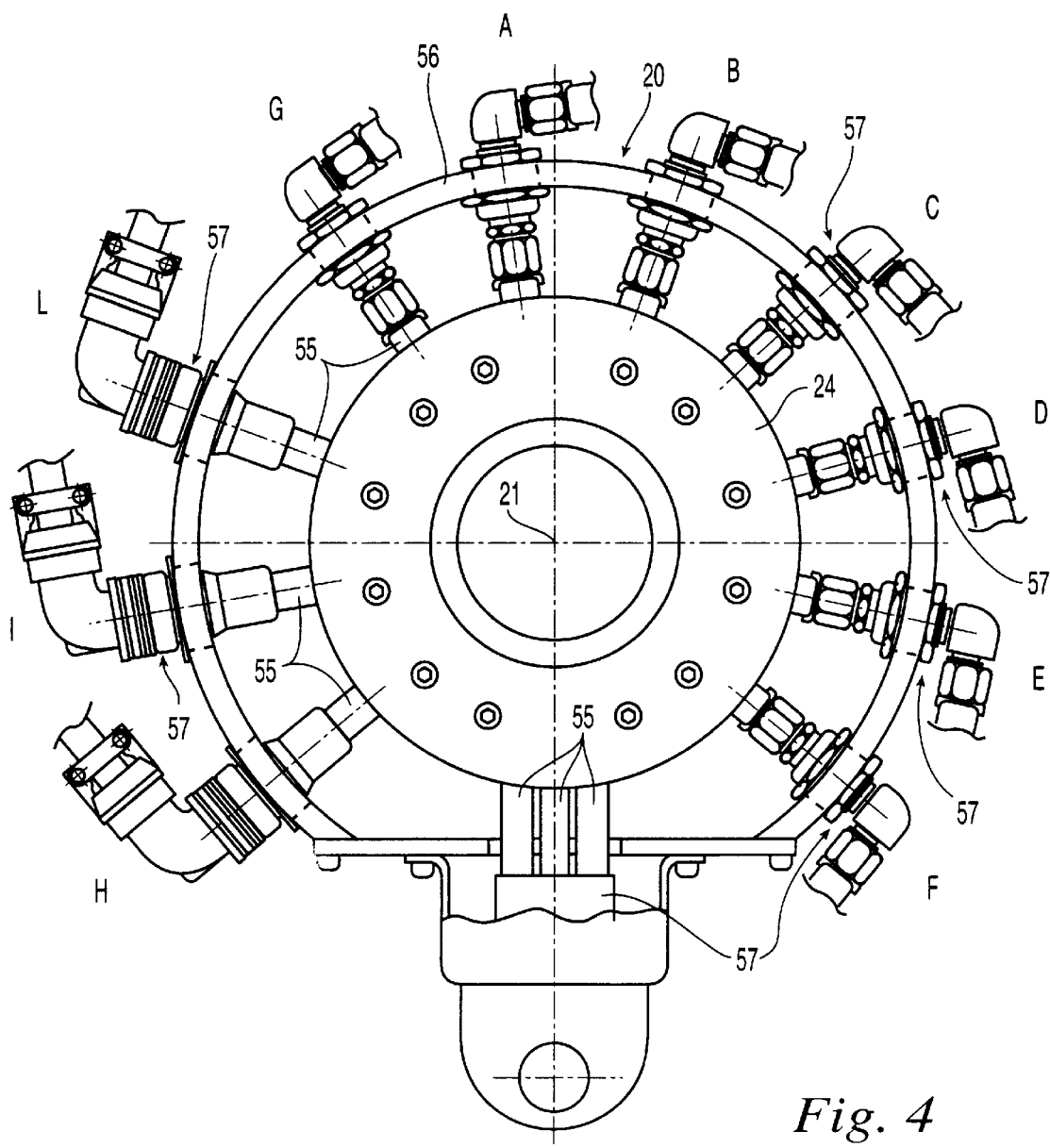
FIG. 4 is a view taken along arrow IV of FIG. 3 of the robot wrist.

With reference to FIGS. 3, 4, the third wrist element 20 has a peripheral wall 56 along which there are provided connecting elements or connectors 57 arranged radially with respect to axis 21 for connecting the various utilities on the tool secured to the coupling flange 24.

Due to the radial arrangement of the outlets of the supply cables 55 on the third wrist element 20, the coupling flange 24 for the tool can have a simple structure and particularly can be of the same standardized type normally used in robots having supply cables arranged outside the wrist.

With reference in particular to the embodiment shown in FIG. 4, the outlets at the positions designated by letters A, B, C, D are for water directed to the circuit for cooling the electrodes of the welding head. The outlets at positions E, F and G are for pressurized air directed to the welding head actuator. Finally connectors at positions H, I, L carry input or output signals for sensor devices carried by the tool, and the three cables 55 at the lowermost position in FIG. 4 are those for the power electric supply to the electrodes which are connected by means of the respective connector 57 to an outer cable 58 (FIG. 3).

Naturally, during use of the robot, the flexibility of cables and tubes 55 allows for relative movements of the three wrist elements.

From the foregoing description, it is clearly apparent that the robot according to the invention has a simplified wrist structure and particularly has a tool coupling flange of standardized type.

Naturally, while the principle of the invention remains the same, the details of construction and the embodiments may widely vary with respect to what has been described and illustrated purely by way of example, without departing from the scope of the present invention.

I claim:

1. Wrist for an industrial robot comprising:

a first wrist element, carried by a robot arm rotatable around a first axis with respect to a structure supporting said robot arm, a second wrist element, rotatably supported by said first wrist element around a second axis which crosses the first axis at an angle relative thereto, a third wrist element rotatably supported by said second wrist element around a third axis which is inclined with respect to the second axis and is coplanar with said first and second axes, said third wrist element including a tool coupling flange, and electric and fluid supply lines extending through said robot arm and said wrist elements, wherein said arm is hollow and said second and third wrist elements are connected in rotation with two tubular shafts arranged concentrically inside said robot arm, the ends of said arm and said tubular shafts opposite to the robot wrist being connected to respective motors for driving rotation of said arm and said second and third wrist elements, said wrist elements and said concentrical tubular shafts leaving a space inside thereof free for passage of said electric and fluid supply lines for the tool which is to be coupled to the robot wrist, wherein said third wrist element has a standardized front flange for coupling the tool and comprises a peripheral wall provided with a plurality of radial outlets connected to said supply lines.

2. Robot wrist according to claim 1, wherein said motors are carried by said structure supporting the robot arm and are connected to said arm and to said tubular concentrical shafts by means of pairs of gears having parallel axes.

3. Robot, wherein it comprises a wrist according to claim 1.

4. Robot, wherein it comprises a wrist according to claim 2.

* * * * *